United States Patent [19]

Balazek et al.

[11] Patent Number: 4,938,823
[45] Date of Patent: Jul. 3, 1990

[54] PULTRUSION/EXTRUSION METHOD

[75] Inventors: David T. Balazek, Stow; Thomas J. Griffiths, Ravenna; David E. Pearson, Hudson, all of Ohio

[73] Assignee: The Pultrusions Corporation, Aurora, Ohio

[21] Appl. No.: 255,752

[22] Filed: Oct. 7, 1988

[51] Int. Cl.$^5$ .............................................. B32B 31/00
[52] U.S. Cl. .................................. 156/166; 156/269; 428/294
[58] Field of Search ............... 156/166, 269, 244.11; 428/294

[56] References Cited

U.S. PATENT DOCUMENTS

| | | | |
|---|---|---|---|
| 3,185,603 | 5/1965 | Boggs | 156/200 |
| 3,306,797 | 2/1967 | Boggs | 156/171 |
| 3,340,665 | 9/1967 | Kohl | 52/656 |
| 3,448,489 | 6/1969 | Boggs | 18/4 |
| 3,530,212 | 9/1970 | Kienle et al. | 264/137 |
| 3,895,896 | 7/1975 | White et al. | 425/93 |
| 4,515,737 | 5/1985 | Karino et al. | 264/22 |
| 4,752,513 | 6/1988 | Rau et al. | 428/294 |

FOREIGN PATENT DOCUMENTS 590034 7/1947 United Kingdom.
2186833 8/1987 United Kingdom.

*Primary Examiner*—James J. Bell
*Attorney, Agent, or Firm*—Renner, Kenner, Greive, Bobak, Taylor & Weber

[57] ABSTRACT

A method for the manufacture of fiber reinforced plastic articles includes the steps of pultruding a first profile through a die and applying a thermoplastic resin to the first profile to form a second profile bonded integrally to the first profile. A fiber reinforced plastic article (10) prepared according to the method of the present invention comprises a first profile (11) comprising a plurality of continuous fiber reinforcing materials (13) and a thermosetting resin (14) impregnating the reinforcing material and, a second profile (12) integrally bonded to the first profile and comprising a thermoplastic resin (65).

9 Claims, 2 Drawing Sheets

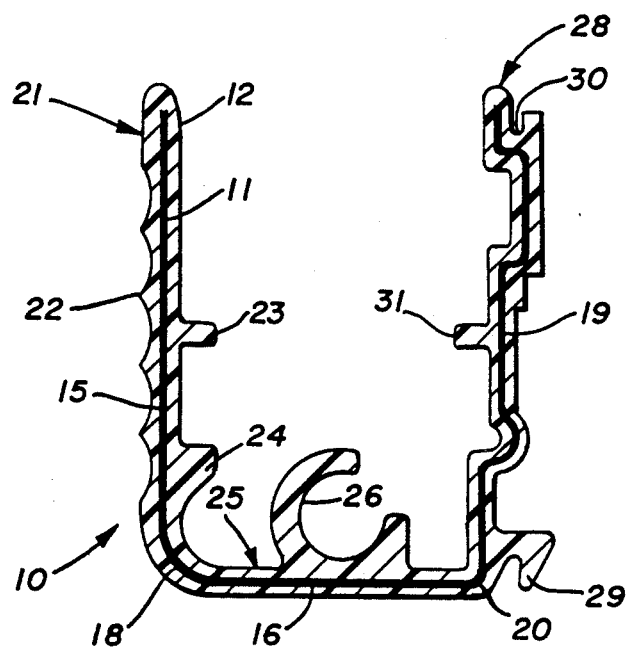
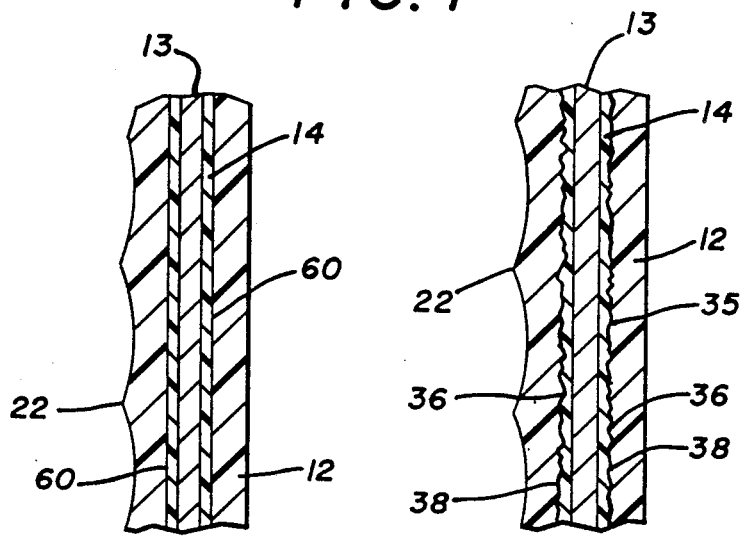
FIG. 1
FIG. 2     FIG. 4

PULTRUSION/EXTRUSION METHOD

TECHNICAL FIELD

The present invention pertains to a method for applying polymer layers to various profiles, for example window and door frame channels or profiles used in the construction trade. Such profiles can be made of fiber reinforced plastics or FRP namely thermosetting plastics, such as epoxies and polyesters, reinforced by fibrous reinforcements sometimes referred to herein as fiberglass. Fiberglass provides an improvement over wood and aluminum; in the former instance it is not affected by moisture, while in the latter, it possesses superior insulative values. Nevertheless, fiberglass profiles have several shortcomings which relate both to fabrication and use.

BACKGROUND ART

It is known to cover wood window and door frames with plastic coverings. As an example, U.S. Pat. No. 3,340,665 provides a protective coating for window frames which is separately formed from a rigid plastic material and then fitted over a separate wooden frame. If desired, both interior and exterior surfaces of the wood frame can be covered with the plastic channel members and then joined together via heat fusion or mechanical means.

As noted hereinabove, it is also possible to fabricate frame members and related components out of fiberglass and other thermosetting plastics in order to provide durability. In order to fabricate fiberglass profiles, it is known to employ apparatus for the continuous pultrusion of articles having a predetermined cross section. Nevertheless, one of the shortcomings of pultrusion is the limited fabrication ability to continuously produce fine details and sharp corners. Because fiberglass can weather, from an aesthetic standpoint it has become desirable to provide a surface coating of a thermoplastic polymer as a protectant and to enhance the appearance.

As will be explained in greater detail hereinbelow, the present invention provides a method whereby various profiles of thermosetting plastics are given a thermoplastic coating which allows much greater adaption or end use in that a wide range of different cross sections or geometries can be manufactured The method employs a step of crosshead extrusion which heretofore has not been conducted satisfactorily, if at all.

At least one process is known for applying a thermoplastic resin to plastic pipes via crosshead extrusion. The process is described in U.S. Pat. No. 4,515,737 and begins with the extrusion of a non-reinforced plastic in a continuous, cylindrical profile. Next, longitudinal strands of fiber roving are resin impregnated with a thermosetting plastic, wrapped around the pipe and cured. Finally the surface of the pipe is given a surface coating of a thermoplastic, via crosshead extrusion.

This process is limited to the manufacture of a relatively simple plastic pipe having only convex surfaces, not concave or undercut profiles. Also, the process requires a filament winding step to provide the desired transverse strength and finally, there is no provision for integrally bonding the thermosetting polymer to the thermoplastic pipe.

DISCLOSURE OF THE INVENTION

It is therefore an object of the present invention to provide a method for applying at least one thermoplastic extrusion layer to enhance the end use properties of pultruded articles of thermosetting plastics.

It is another object of the present invention to provide a method for the manufacture of pultruded articles providing intricate geometries and profiles.

It is yet another object of the present invention to provide an article comprising an inner layer having a first profile that provides strength and support and an outer layer bonded thereto having a second profile that is weatherable, non-staining, formable and aesthetic and, which can be subsequently machined, which can be made to provide a resilient seal and provide a meltable surface to enhance fabrication.

These and other objects, together with the advantages thereof over known methods and plastic articles, which shall become apparent from the specification which follows, are accomplished by the invention as hereinafter described and claimed.

In general, the present invention provides a method for the manufacture of fiber reinforced plastic articles which comprises the steps of pultruding a first profile through a die, the first profile comprising a plurality of longitudinal strands of a fiber reinforcing material and a thermosetting resin impregnating the reinforcing material and, applying a thermoplastic resin to the first profile to form a second profile bonded integrally to the first profile.

The present invention also provides a fiber reinforced plastic article comprising a first profile comprising a plurality of longitudinal strands of a fiber reinforcing material and a thermosetting resin impregnating the reinforcing material and a second profile integrally bonded to the first profile and comprising a thermoplastic resin.

BRIEF DESCRIPTION OF THE DRAWINGS

FIG. 1 is a cross-section of an exemplary article that can be produced according to the method of the present invention which depicts the first and second profiles of the article;

FIG. 2 is an enlarged view of a segment of the article depicted in FIG. 1 which depicts the components of the first and second profiles;

FIG. 4 is another enlarged view of a segment of an article as depicted in FIG. 1 which depicts a modification of the first and second profiles at the interface thereof.

PREFERRED EMBODIMENT FOR CARRYING OUT THE INVENTION

Figure 3:
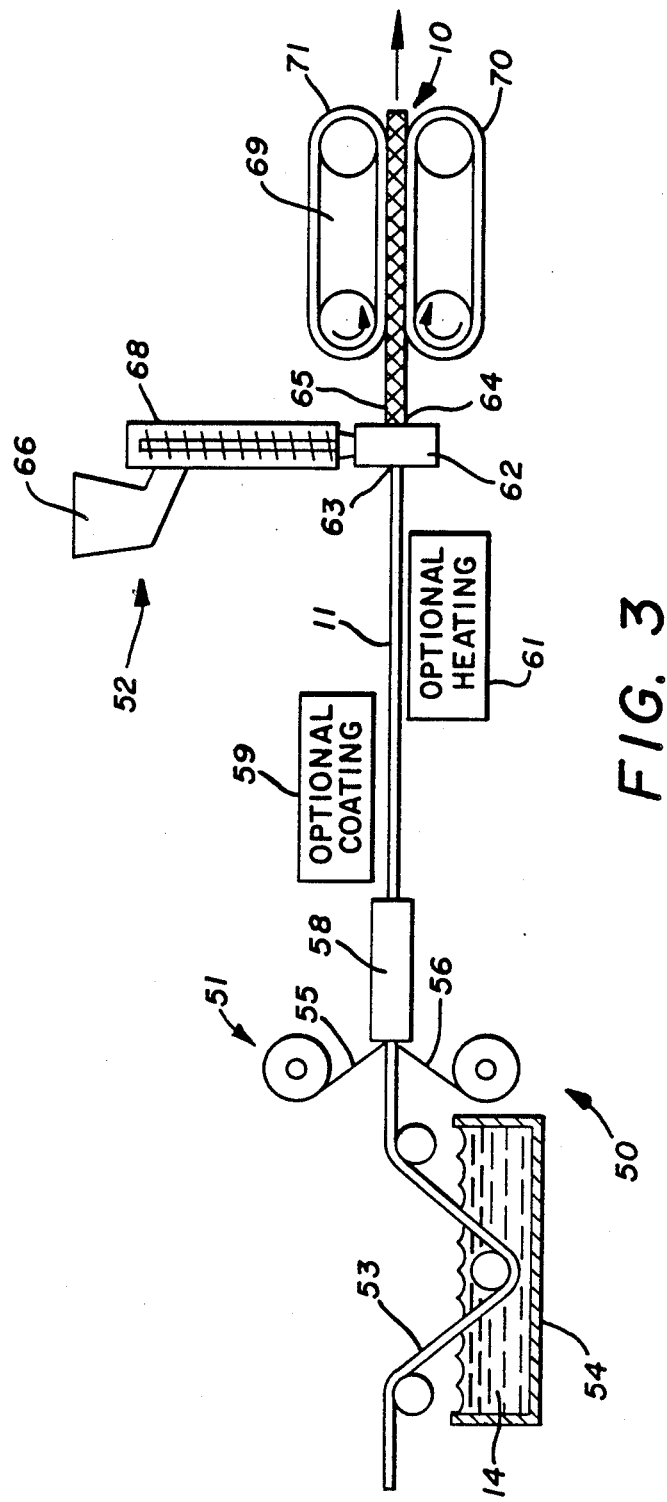
FIG. 3 is a schematic, side elevation of an apparatus suitable for practice of the method of the present invention.

Since the early 1960's data compiled from performance studies and tests have borne out the high strength of fiber glass reinforced resin articles, and pultrusion has afforded a highly successful manufacturing technique for producing such articles in lengths of uniform, predetermined cross-section. To summarize the basic pultrusion technique, the reinforcing materials are drawn continuously through an impregnating bath of liquid resin and into a heated die in which the impregnated reinforcing materials are shaped and the resin cured. The shaped article cools while being drawn to the requisite length, and successive lengths may be drawn and cut from the continuous supply without unduly interrupting the previous stages.

A host of reinforcing materials may be used in combination with a wide variety of matrices to achieve the desired cross-sectional configuration by pultrusion, but by and large the vast majority of pultruded articles comprise a resin material incorporating fiber or fibrous reinforcement —more specifically, liquid, thermosetting resins incorporating fibrous reinforcement, fabrics or mats as the reinforcing material.

The present invention is based on the use of a fiber reinforced plastic or FRP which is formed e.g., by pultrusion, to provide a first profile. This profile can be essentially flat; angled such as L-shaped; open such as U-shaped, C-shaped and the like; closed such as cylindrical or other geometries including triangular, square, rectangular and the like and these profiles can be hollow or solid. Additionally, the wall thickness can be varied from article to article as well as within the same article.

As can be appreciated a variety of products can be made directly from these profiles. Nevertheless, certain articles often require more complex or intricate profiles particularly, for instance, those which are intended to be utilized as channels and frames for the mounting of glass, and related window frames and door frames used in the construction of residential and commercial buildings. For these products as well as other which may be employed for structural purposes and/or ornamental purposes it is also desirable to improve weatherability, formability, as well as appearance and to provide the ability to effect a resilient seal and to provide a meltable surface to enhance fabrication.

According to the method of the present invention, a second profile is bonded integrally to the first profile in order to satisfy the foregoing objectives and others. This is accomplished by extruding a thermoplastic material directly onto the first profile. Thermoplastics are more readily extruded, through an appropriately configured die, to form the desired profile that has been designed to provide the channels, lips, flanges and other structures or appendages that are necessary but could not be effectively formed to make a useful end product from thermoset FRP.

With reference to the drawings and in particular FIGS. 1 and 2, a cross-section of an exemplary window frame channel is depicted generally by the numeral 10. It comprises a first, inner profile 11 and a second, outer profile 12 bonded thereto. The first profile 11 comprises, in turn, a layer of reinforcing fibers 13 which are embedded within a thermosetting resin 14. Suitable fibers include both natural and synthetic fibers such as glass fibers, graphite fibers and the like. Similarly, suitable thermosetting resins include alkyds, diallyl phthalates, epoxies, melamines and ureas, phenolics, polyesters, silicones and the like. Practice of the present invention is not necessarily limited to a particular fiber reinforcement or thermosetting plastic or combination thereof. Nor, is practice limited to only those thermosetting resins recited hereinabove which have been listed as exemplary.

The first profile 11, depicted in FIG. 1, is generally a U-shaped channel. It can provide straight portions such as the left side leg 15 and base 16; curved segments 18 joining the leg and base together; and a somewhat shaped right leg 19 joined by a sharp corner 20 to the base. As can be seen, the first profile 11 is not relatively complex but does provide structural support as a skeleton or backbone for the channel 10.

The second or outer profile 12 totally encompasses the first profile. It provides a left leg, indicated by the numeral 21, which can have a scalloped configuration 22 as well as flanges 23 and 24. At the interior of the base, indicated by the numeral 25, a C-shaped channel 26 is depicted and finally the right leg, indicated by the numeral 28, carries a hook-shaped flange 29, an upper channel 30 and an inner, perpendicular flange 31 opposite the flange 23 which is also perpendicularly disposed from the inner side of left leg 21.

The configuration of the second profile 12 thus provides several appendages that could not be effectively formed by pultrusion of the first profile 11. Also, while thermoset plastics are rigid, the use of thermoplastic materials for the second profile allows flexible, even somewhat elastic materials to be employed. Representative thermoplastic polymers include acrylonitrile-butadiene-styrene (ABS), acetals, acrylics, cellulosics, fluorocarbons, ionomers, liquid crystal polymers, nylons, polycarbonates, polyesters, polyolefins such as polyethylene and the like, polystyrenes, polysulfones, thermoplastic elastomers, vinyls and the like, as well as alloys, compounds and mixtures of the above. Again, it is to be appreciated that the selection of a suitable thermoplastic can be made by one skilled in the art, depending upon the requirements of the finished article and thus, the present invention is not limited to any specific thermoplastic. Nor, should the foregoing list be construed as a limitation on the types of thermoplastics that can be employed.

In order to insure that the second profile bonds integrally to the first profile, a roughened exterior surface, depicted as 35 in FIG. 4, can optionally be provided on the first profile This exterior can comprise various forms of interstices such as a series of small depressions 36 and ridges 38 as shown, or other deformations that give rise to a non-smooth exterior 35.

The interstices or deformations can be imparted in a variety of manners which can occur during formation of the first profile or subsequent thereto, as by subjecting the profile to a mechanical means for roughening the surface or a chemical means to etch or provide interstices in the surface. By providing such deformations on the exterior surfaces of the first profile 11, the molten thermoplastic material which forms the second profile 12 is mechanically and integrally bonded thereto.

The foregoing articles and others having first and second profiles are manufactured with pultrusion and crosshead extrusion apparatus. With reference to FIG. 3, the method of the present invention shall be described next in conjunction with such apparatus. The overall apparatus, depicted generally by the numeral 50 includes pultrusion apparatus, generally 51 and extrusion apparatus, generally 52.

The method begins with the step of pultruding the first profile 11. Continuous strands of longitudinal fiber 53, or roving in the case of fiberglass, are fed through a trough 54 provided with a thermosetting resin 14. These are combined with one or more fibrous reinforcing mats 55, 56 and pulled through a die 58, in which the thermoset resin is solidified, usually thy heat or by chemical reaction, and the configuration of the first profile is developed.

One method for deforming the exterior surfaces of the first profile 11 can be performed within the pultrusion die 58. Namely, by adjusting the temperature therein, it is possible to boil some of the monomer which tends to form bubbles in the thermosetting resins. Many of these bubbles burst just prior to solidification of the resin, and provide the depressions 36 and ridges 38 depicted in FIG. 4. Of course, another manner of deforming the surface could involve the use of an appropriately configured die to provide a suitably roughened surface. Any other method of surface deformation could be practiced downstream of the die 58 by means (not shown) as discussed hereinabove.

Although the next step of the method is applying the thermoplastic resin to the first profile, the method also includes an optional step of coating the first profile with a primer, adhesive or adhesive promoter composition to improve adhesion between the first and second profiles i.e., the thermosetting and thermoplastic resins. Thus, after emerging from the die 58, the profile 11 is drawn through a coating mechanism, schematically depicted by box 59, to include various means of coating such as dipping, brushing, spraying, rolling and the like.

At this stage an adhesive composition 60 formulated to be compatible with the materials of the first and second profiles 11 and 12, such as an acrylic adhesive, is applied. A second optional step of heating may also be employed prior to the step of applying by drawing the profile 11 through heaters 61 or ovens, as appropriate. The heating step serves to dry or cure any primer or adhesive composition previously applied and to provide optimum conditions for application of the thermoplastic. It may also be employed separately, without the coating step. The coating step is particularly useful for the embodiment depicted in FIG. 3 wherein a roughened exterior surface 35 is not provided.

The profile 11 is then pulled into a crosshead extrusion die 62. The entrance 63 to this die is configured to fit or accept the shape of the first profile while the exit 64 of the die is shaped to produce the desired second or final profile. Thermoplastic material 65 is fed into the hopper 66 of a conventional extruder 68 and is bonded to the first profile 11 within the die 62.

Finally, a puller mechanism 69 is employed which continuously draws the article 10 through the apparatus 50. The puller mechanism 69 provides two conveyor belts 70 and 71 which are counter-rotated, gripping the article 10 therebetween and providing continuous, non-interrupted movement thereof. The method is not restricted to this apparatus. The article can subsequently be cut to suitable lengths with a conventional saw or cut-off mechanism, such as a flying cut-off saw, not shown.

As should now be appreciated, the method of the present invention is useful for the manufacture of fiber reinforced plastic articles that have both structural rigidity as well as decorative and protective coatings which can provide functional geometric configurations. While the method is basically practiced by the steps of pultruding a first profile and applying a thermoplastic resin thereto, the method can optionally include the steps of deforming the exterior surfaces of the first profile or coating the first profile and/or heating the first profile. Also, while the second profile can readily be applied to all surfaces of the first profile, it is also possible to extrude the thermoplastic material over select surfaces of the first profile, depending again upon the dictates of the intended use.

Based upon the foregoing disclosure, it should now be apparent that the use of the assemblies described herein will carry out the objects set forth hereinabove. It should also be apparent to those skilled in the art that the method of the present invention can be practiced to manufacture a variety of fiber reinforced plastic articles having an outer layer formed from a thermoplastic. Similarly, the temperatures and pressures of operation and the speed at which the article is continuously formed can readily be determined by those skilled in the art.

It is, therefore, to be understood that any variations evident fall within the scope of the claimed invention and thus, the selection of specific thermoset and thermoplastic resins, fiber reinforcements and optional coating materials and the optional method steps can be determined without departing from the spirit of the invention herein disclosed and described. Moreover, the scope of the invention shall include all modifications and variations that may fall within the scope of the attached claims.

We claim:

1. A method for the manufacture of fiber reinforced plastic articles comprising the steps of:
    pultruding a first profile through a die, said first profile comprising a plurality of longitudinal strands of a fiber reinforcing material and a thermosetting resin impregnating said reinforcing material;
    curing said thermosetting resin; and
    applying a thermoplastic resin to said cured first profile in a separate die and forming a second profile bonded integrally to said first profile.

2. A method, as set forth in claim 1, wherein said step of applying includes the steps of:
    melting said thermoplastic resin in an extruder and feeding it to an extrusion die;
    drawing said first profile into said die where it contacts said resin; and
    forming said second profile within said die to produce said article.

3. A method, as set forth in claim 2, wherein said steps of pultruding and applying are conducted continuously.

4. A method, as set forth in claim 2, including the further step of:
    deforming the exterior surfaces of said first profile.

5. A method, as set forth in claim 4, wherein said step of deforming is conducted within said die.

6. A method, as set forth in claim 4, wherein said step of deforming is conducted subsequent to said step of pultruding.

7. A method, as set forth in claim 2, including the additional step of:
    coating said first profile prior to said step of applying with a compound to improve adhesion between said first and second profiles.

8. A method, as set forth in claim 7, including the additional step of:
    heating said first profile after said step of coating.

9. A method, as set forth in claim 2, including the additional step of:
    heating said first profile prior to said step of applying.

* * * * *